US012434563B2

United States Patent
Chandra

(10) Patent No.: US 12,434,563 B2
(45) Date of Patent: Oct. 7, 2025

(54) DRIVER ALERT DISPLAY ELEMENT

(71) Applicant: ZF Passive Safety Systems US Inc., Washington, MI (US)

(72) Inventor: Prathap Chandra, Shelby Township, MI (US)

(73) Assignee: ZF Passive Safety Systems US LLC, Washington, MI (US)

( * ) Notice: Subject to any disclaimer, the term of this patent is extended or adjusted under 35 U.S.C. 154(b) by 21 days.

(21) Appl. No.: 18/299,962

(22) Filed: Apr. 13, 2023

(65) Prior Publication Data

US 2024/0343114 A1 Oct. 17, 2024

(51) Int. Cl.
*B60K 35/00* (2024.01)
*B60K 35/22* (2024.01)
*B60K 35/28* (2024.01)
*B60K 35/53* (2024.01)
*B60K 35/60* (2024.01)
*B60K 35/65* (2024.01)
*B60Q 9/00* (2006.01)
*B62D 1/06* (2006.01)
*B62D 1/10* (2006.01)

(52) U.S. Cl.
CPC ............ *B60K 35/00* (2013.01); *B60Q 9/00* (2013.01); *B62D 1/06* (2013.01); *B62D 1/10* (2013.01); *B60K 35/22* (2024.01); *B60K 35/28* (2024.01); *B60K 35/53* (2024.01); *B60K 35/60* (2024.01); *B60K 35/654* (2024.01); *B60K 2360/178* (2024.01); *B60K 2360/782* (2024.01)

(58) Field of Classification Search
CPC ........ B60K 35/00; B60K 35/22; B60K 35/28; B60K 35/53; B60K 35/60; B60K 35/654; B60K 2360/178; B60K 2360/782; B60Q 9/00; B62D 1/06; B62D 1/10
See application file for complete search history.

(56) References Cited

U.S. PATENT DOCUMENTS

| 2006/0096409 | A1* | 5/2006 | Weiss | B62D 1/065 74/552 |
|---|---|---|---|---|
| 2008/0023253 | A1* | 1/2008 | Prost-Fin | G08G 1/168 701/41 |
| 2010/0046082 | A1* | 2/2010 | Croy | G03B 21/10 359/632 |
| 2014/0139651 | A1* | 5/2014 | Jiang | G02B 30/29 348/52 |
| 2019/0071112 | A1* | 3/2019 | Toddenroth | B60R 21/2032 |
| 2022/0135112 | A1* | 5/2022 | Harmon | B60R 11/0229 180/334 |

* cited by examiner

*Primary Examiner* — Omeed Alizada
(74) *Attorney, Agent, or Firm* — Tarolli, Sundheim, Covell &Tummino LLP

(57) ABSTRACT

An alert arrangement is disclosed which includes a display member, a light member, a motor or solenoid and a gear system. The display member further includes a display surface thereon. The motor or solenoid is connected to the gear system and the motor or solenoid activates the gear system to move the display member between a first storage position and a second position. While in the first storage position, the display surface is not visible to a driver. When the display surface is in the second position, the display surface is visible to the driver and the light member is directed toward the display surface. A steering wheel arrangement is also disclosed that employs the alert arrangement.

18 Claims, 2 Drawing Sheets

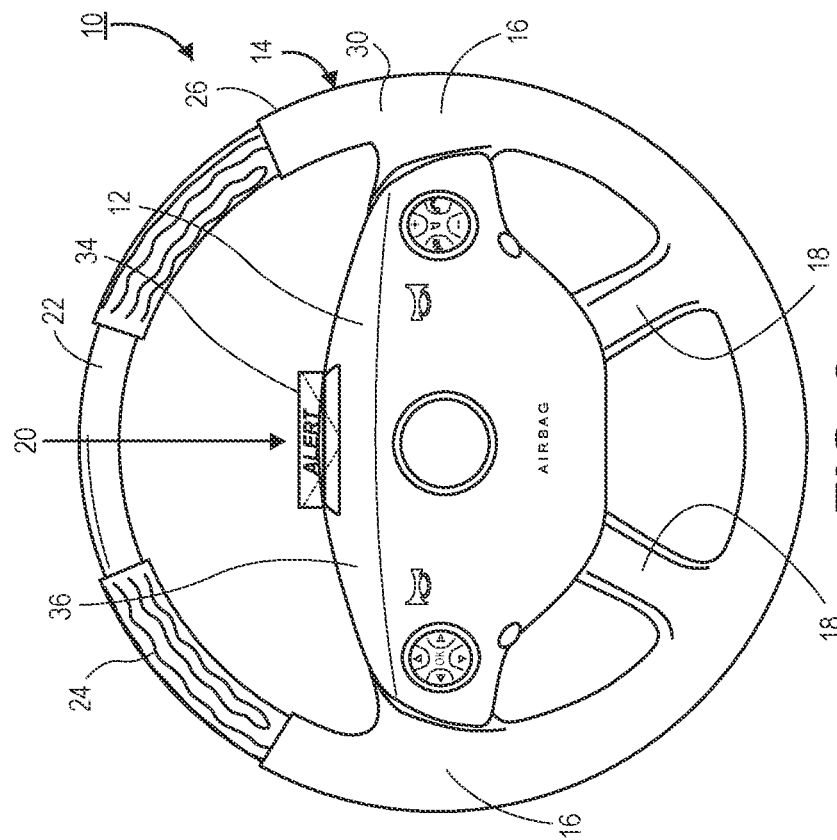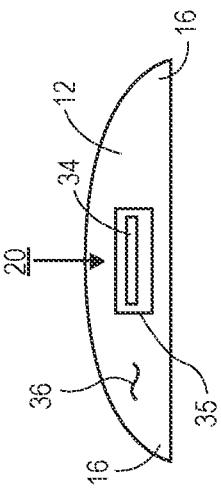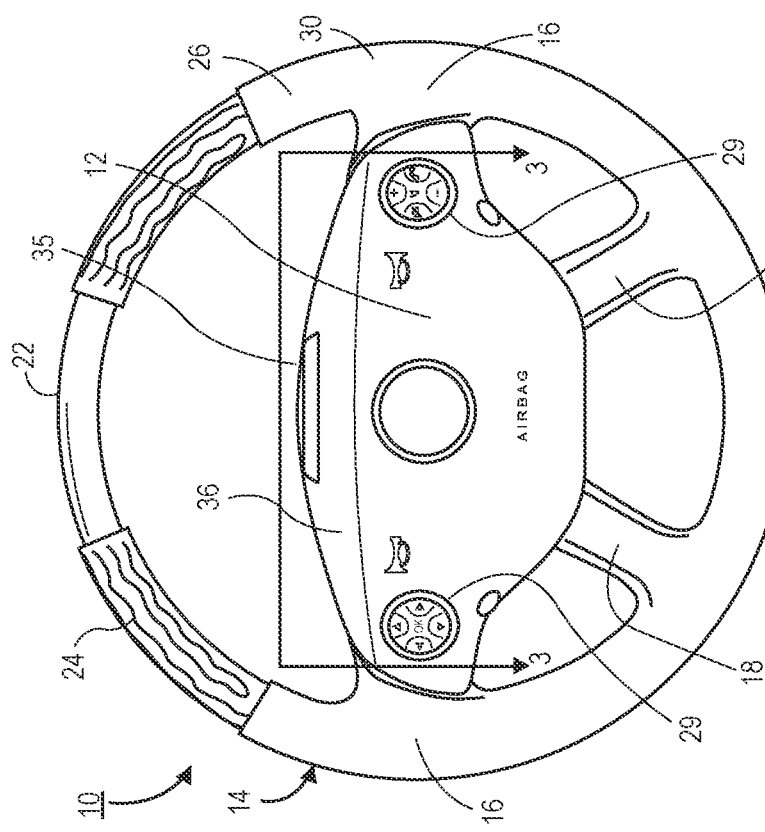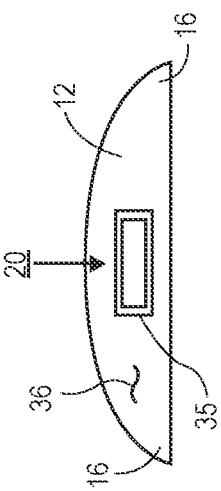

DRIVER ALERT DISPLAY ELEMENT

TECHNICAL FIELD

The disclosure relates generally to a driver alert display element, and more specifically to a driver alert display element within a steering mechanism that alerts a driver to a potential driving hazard.

BACKGROUND

During a driving operation of a vehicle, at times a potential driving hazard may occur, such as obstacles occurring in a vehicle driving pathway. Armed with knowledge of such an impending obstacle, a vehicle driver may be able to make an adjustment of the vehicle operation, thereby avoiding a potential collision or other hazard.

However, communicating with the vehicle driver can be challenging, especially if the vehicle's infotainment center is activated, or the vehicle driver is using a mobile phone. Thus, what is needed is an alert system that can alert the vehicle driver's attention to a potential hazard, within the vehicle driver's typical viewing area when operating the vehicle.

SUMMARY

In one exemplary arrangement, an alert arrangement is disclosed which includes a display member, a light member, a motor and/or a solenoid and a gear system. The display member further includes a display surface thereon. The motor/solenoid is connected to the gear system and the motor/solenoid activates the gear system to move the display member between a first storage position and a second position. While in the first storage position, the display surface is not visible to a driver. When the display surface is in the second position, the display surface is visible to the driver and the light member is directed toward the display surface.

In one exemplary arrangement, the display surface is pivotally mounted to a housing and the gear system pivots the display surface about a pivot point to move the display surface between the first storage position and the second position.

The motor may be a stepper motor, a servo motor or a DC motor.

The light member may be an LED element. The LED element may be an array of LED lights or a single LED light. In one exemplary arrangement, the LED element emits a single color light. Alternatively, the LED element emits multiple color light.

A lens is positioned between the light element and the display surface when the display member is in the second position.

In one exemplary arrangement, the display surface is reflective and may have a design element thereon. Alternatively, the display surface may have a lenticular surface.

A controller board is operatively connected to the motor/solenoid and the light member and serves to actuate the alert system.

In one exemplary arrangement, the alert arrangement is disposed within a steering wheel arrangement such that the alert arrangement is disposed within a main body of a steering wheel.

BRIEF DESCRIPTION OF DRAWINGS

Further advantages and features of the disclosure will be found in the following description and in the accompanying drawings, to which reference is made. In the drawings:

FIG. 1 is a front plan view of a steering arrangement having an alert element disposed therein in a non-alert position according to the disclosure;

FIG. 2 is a front plan view of the steering arrangement of FIG. 1, in an alert position according to the disclosure;

FIG. 3 is a top plan view of the steering arrangement of FIG. 1, taken along lines 3-3 in FIG. 1;

FIG. 4 is a top plan view of the steering arrangement of FIG. 2, taken along lines 4-4 in FIG. 2;

DETAILED DESCRIPTION

Figure 5:
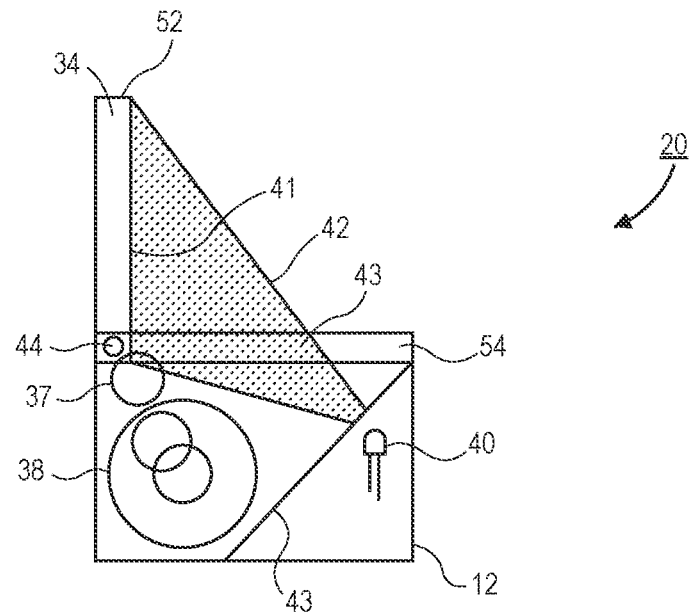
FIG. 5 is a schematic cross-sectional view of the steering arrangement of FIG. 2, in the alert position.
Figure 6:
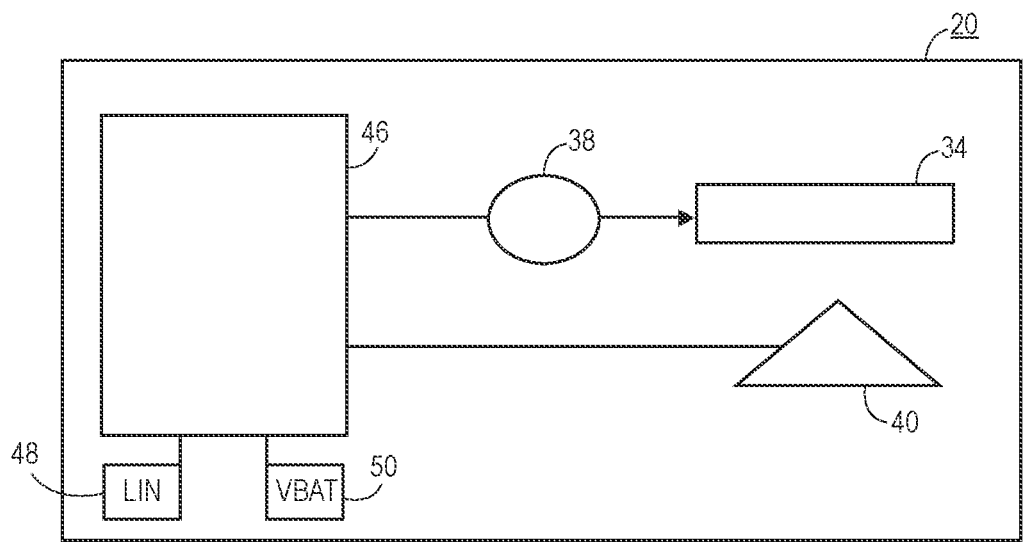
FIG. 6 is control diagram of alert system.

Referring now to the discussion that follows and also to the drawings, illustrative approaches to the disclosed assemblies and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Referring to FIGS. 1-6, an exemplary arrangement of a steering arrangement 10 having an alert arrangement 20 is shown. In the exemplary arrangement shown, the steering arrangement 10 includes a steering wheel main body 12, a gripping handle 14, and first connecting portions 16 and second connecting portions 18. The alert arrangement 20 is disposed within the main body 12, as will be explained in further detail below.

In the exemplary arrangement shown, the gripping handle 14 is configured as a generally circular member, though other configurations are also contemplated without departing from the disclosure. The gripping handle 14 comprises a core member 22, an optional climate member 24 and an outer grip member 26. In one exemplary arrangement, the core member 22 is a continuous unitary member. Alternatively, the core member 22 may be made up of two or more elements fixedly secured together.

The climate member 24 may be wrapped around at least a portion of the core member 22. In another exemplary arrangement, the climate member 24 is disposed around portions of the core member 22 above main body 12, and between connecting portions 18. The climate member 24 is electrically connected to a vehicle ECU (not shown) that allows a user to selectively turn on or off a heating and/or cooling element 28 integrated into the climate member 24. In one exemplary arrangement, actuating buttons 29 are disposed within the main body 24 that allow a driver to selectively adjust the temperature of the climate member 24, or even activate the climate member 24.

The outer grip member 26 overlays the core member 22 and climate member 24. The outer grip member 26 may further comprise mounting sections 30 disposed on either side of the outer grip member 26, in an opposing manner. The mounting sections 30 have an increase thickness as compared with the thickness of gripping portions 32 of the outer grip member 26. The mounting sections 30 cooperate with the first connecting portions 16 disposed on either side of the main body 12 to fixedly position the main body 12 within the gripping handle 14.

In addition to the mounting sections 30 and first connecting portions 16, the steering arrangement 10 may further include optional one or more second connecting portions 18. Second connecting portions 18 extend radially inward from the outer grip member 26 toward the main body 12 to provide additional support for the main body 12. In one exemplary arrangement there are a pair of second connecting portions 18. However, it is understood that the second connecting portions 18 may be eliminated in their entirety or, alternatively include just more than two connecting portions 18. In a further exemplary arrangement, the second connecting portions 18 may be integrally formed with the outer grip member 26. Alternatively, the second connecting portions 18 may be integrally formed with the main body 12.

Disposed with in the main body 12, is the alert arrangement 20. The alert arrangement 20 is selectively activated upon a predetermined event, such as a potential driving hazard, to at least visually alert a driver to an impending potential driving hazard. The alert arrangement 20 includes a display member 34 that may be selectively moved from a first stored position (for example, as shown in FIGS. 1 and 3), and a second activated position (for example as shown in FIGS. 2 and 4). In one exemplary arrangement, when the display member 34 is the first stored position, the display member 34 is disposed within a portion of the main body 12, such that it is not visible to a driver. When the display member 34 is in the second activated position, the display member 34 extends through an opening 35 in the main body 12 and above a top surface 36 of the main body 12, as seen in FIG. 2, for example.

In one exemplary arrangement, the display member 34 may be illuminated by a light member to attract the driver's attention, as will be explained in further detail below. In a further exemplary arrangement, the display member 34 may have a design or pattern etched therein designed to alert the driver. In one exemplary arrangement, the display member 34 is constructed of a reflective material such that the light member serves to illuminate the reflective material, as explained in further detail below.

Referring to FIG. 5, details of an exemplary arrangement of the alert arrangement 20 will be explained in further detail. In one exemplary arrangement, in addition to the display member 34, the alert arrangement 20 further comprises a gear system 37, a motor and/or solenoid 38 and the light member 40. In one exemplary arrangement, the display member 34 is configured with a display surface 42 that is reflective, so as to reflect light from the light member 40 to the driver, when the alert arrangement 20 is in the activated second position. More specifically, the light member 40 is disposed within the main body 12 and oriented to direct a cone of light 43 toward the display surface 42. In one exemplary arrangement, the display surface 42 may be configured to simply reflect light from the light member 40 back to the driver, as indicated by the light projection arrows 41. Alternatively, the display surface 42 may be configured with a lenticular surface that displays different images as the display surface moves between the first storage position to the second activated position.

The light member 40 may be an LED single light or an array of LED lights, and may be a single color or multi-color. In one exemplary arrangement, a lens 43, such as a fresnel lens, may be positioned between the light member 40 and the display surface 42, with in the main body 12, to focus the illumination. The light member may be a low power LED or a high power LED, depending on how much light is needed. For example, in one exemplary arrangement, a high power LED may be greater than 3 watts, while a low powered LED may be between 1-3 watts.

In one exemplary arrangement, the light member 40 may be a top mounted light member 40, as shown in FIG. 5. Alternatively, the light member 40 may extend through an aperture in the main body 12 (not shown), or may be a side-mounted or other surface mounted arrangement.

In one exemplary arrangement, the display member 34 is pivotally connected to the main body at a pivot 44 that is mounted within the main body 12. The pivot 44 is operatively connected to the gear system 36. The gear system 37 is operatively connected to the motor/solenoid 38. Thus, when the motor/solenoid 38 is activated, the gear system 37 moves in a first direction, activating the pivot 44 to move the display member 34 into the activated position, as shown in FIG. 5. When the vehicle is placed in the "park" position, the engine is turned off, or the alert arrangement 20 deactivated, the motor/solenoid 38 will be biased to move or retain the gear system 37 in a second direction, activating the pivot 44 to the storage position shown in FIG. 1.

The motor 38 can be any suitable motor. In one exemplary arrangement, the motor 38 may be a stepper motor. Alternatively, the motor 38 may also be a servo motor or a DC motor.

The alert arrangement 20 further comprises a controller board 46 which is operatively connected to an ECU (not shown) of a vehicle through a LIN bus 48 and powered by a battery 50. The motor/solenoid 38 is connected to the controller board 46 and to the display member 34. The controller board 46 is also connected to the light member 40. In operation, when the vehicle ECU receives a signal from one or more vehicle sensors (not shown), such as for example, vehicle cameras, radar, and/or lidar devices, that are indicative of an impending hazardous event, the controller board 46 may power the light member 40, as well as activate the motor/solenoid 38. The motor/solenoid 38 then causes the gear system 37, which is operatively connected to the display member 34, to rotate, thereby causing the display member 34 to pivot about the pivot point 44, raising upwardly to expose the display surface 42 to a light projection cone 51. With this arrangement, the light will reflect any image incorporated onto the display surface 42 to the driver. In one exemplary arrangement, where the display surface 42 is a lenticular type, the motor/solenoid 38 may be controlled to activate the gear system 37 to orient the display surface 42 to predefined angles to display different images at different angles.

In a further exemplary arrangement, the display member 34 may form a switch circuit with the main body 12 such that when a first switch element 52 mounted on the display member 34 comes out of contact with a second switch element 54, the light member 40 is configured to turn on. With this arrangement, when the display member 34 is in the first stored position, the light member 40 will be automatically turned off.

The display system 20 may also comprise a reset option. For example, in one exemplary arrangement, the activating buttons 29 may incorporate a reset button that activates the controller board 46 to reverse the motor 38 to pivot the display member 34 so as to return the display member 34 to the first stored position and to turn off the light member 40. Alternatively, or in addition, the ECU may be configured to automatically return the display member 34 to the first stored position upon the vehicle powering down or being placed in the "park" operational mode.

It will be appreciated that the assemblies and methods described herein have broad applications. The foregoing exemplary arrangements were chosen and described in order to illustrate principles of the methods and apparatuses as well as some practical applications. The preceding description enables others skilled in the art to utilize methods and apparatuses in various arrangements and with various modifications as are suited to the particular use contemplated. In accordance with the provisions of the patent statutes, the principles and modes of operation of this disclosure have been explained and illustrated in exemplary arrangements.

It is intended that the scope of the present methods and assemblies be defined by the following claims. However, it must be understood that this disclosure may be practiced otherwise than is specifically explained and illustrated without departing from its spirit or scope. It should be understood by those skilled in the art that various alternatives to the arrangements described herein may be employed in practicing the claims without departing from the spirit and scope as defined in the following claims. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary. It is intended that the following claims define the scope of the invention and that the method and apparatus within the scope of these claims and their equivalents be covered thereby. In sum, it should be understood that the invention is capable of modification and variation and is limited only by the following claims.

What is claimed:

1. An alert arrangement, comprising:
   a display member having a display surface thereon, wherein the display surface is pivotally mounted directly to a housing;
   a light member;
   a motor or solenoid; and
   a gear system;
   wherein the motor or solenoid is connected to the gear system and the motor or solenoid activates the gear system pivots the display surface about a pivot point mounted to the housing to move the display member between a first storage position, whereby the display surface is not visible to a driver, and a second position whereby the display surface is visible to a driver; and
   wherein the light member is directed onto the display surface when the display member is in the second position.

2. The alert arrangement of claim 1, wherein the motor is one of a stepper motor, a servo motor or a DC motor.

3. The alert arrangement of claim 1, wherein the light member is an LED element.

4. The alert arrangement of claim 3, wherein the LED element is an array of LED lights.

5. The alert arrangement of claim 3, wherein the LED element emits a single color light.

6. The alert arrangement of claim 1, further comprising a lens positioned between the light element and the display surface when the display member is in the second position.

7. The alert arrangement of claim 1, wherein the display surface is reflective.

8. The alert arrangement of claim 1, wherein the display surface is a lenticular surface.

9. The alert arrangement of claim 1, further comprising a controller board operatively connected to the motor and the light member.

10. A steering wheel assembly, comprising: a gripping wheel; a main body connected to the gripping wheel; and an alert arrangement disposed within the main body; wherein the alert arrangement further comprises: a display member having a display surface thereon; a light member; a motor or solenoid; and a gear system; wherein the motor or solenoid is connected to the gear system and the motor or solenoid activates the gear system to move the display member between a first storage position, whereby the display surface is not visible to a driver, and a second position whereby the display surface is positioned above the main body; and wherein the light member disposed within the main body and is directed toward the display surface when the display member is in the second position; and
    wherein the display surface is pivotally mounted directly to the main body and the gear system pivots the display surface about a pivot point mounted directly to the housing, to move the display surface between the first storage position and the second position.

11. The steering wheel assembly of claim 10, further comprising first and second connecting portions, wherein the first connecting portions are disposed at opposing locations and attach the gripping wheel to the main body and wherein the second connecting portions connect the gripping wheel to the main body.

12. The steering wheel assembly of claim 10, wherein the gripping wheel further comprises a core member and an outer grip member.

13. The steering wheel assembly of claim 12, further comprising a climate member disposed between the core member and the grip member.

14. The steering wheel assembly of claim 10, further comprising a lens positioned within the main body and between the light element and the display surface when the display member is in the second position.

15. The steering wheel assembly of claim 10, wherein the display surface is reflective.

16. The steering wheel assembly of claim 10, wherein the display surface is a lenticular surface.

17. The steering wheel assembly of claim 10, further comprising a controller board operatively connected to the motor and the light member.

18. The steering wheel assembly of claim 10, wherein the main body further comprises an actuating button that is operative to return the display member from the second position to the first storage position.

* * * * *